No. 893,371. PATENTED JULY 14, 1908.
J. W. RAPER.
FENDER FOR AGRICULTURAL IMPLEMENTS.
APPLICATION FILED SEPT. 16, 1907.
2 SHEETS—SHEET 1.
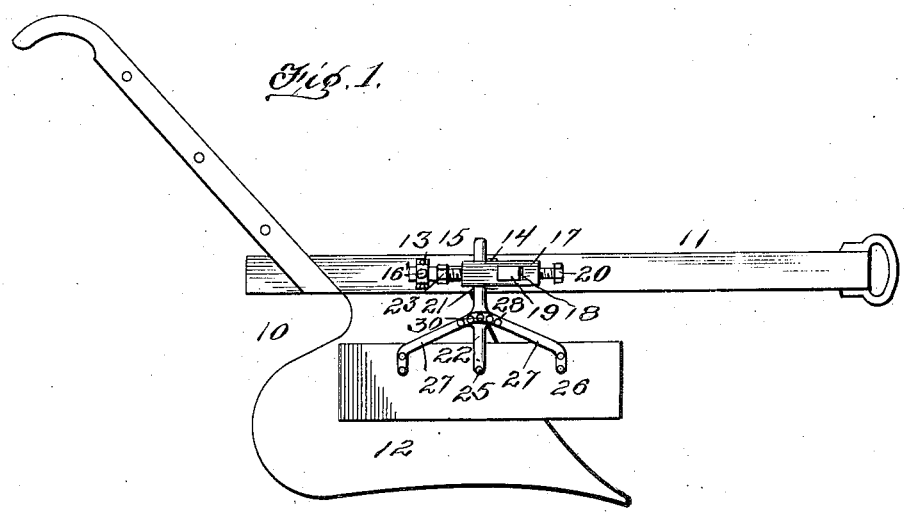
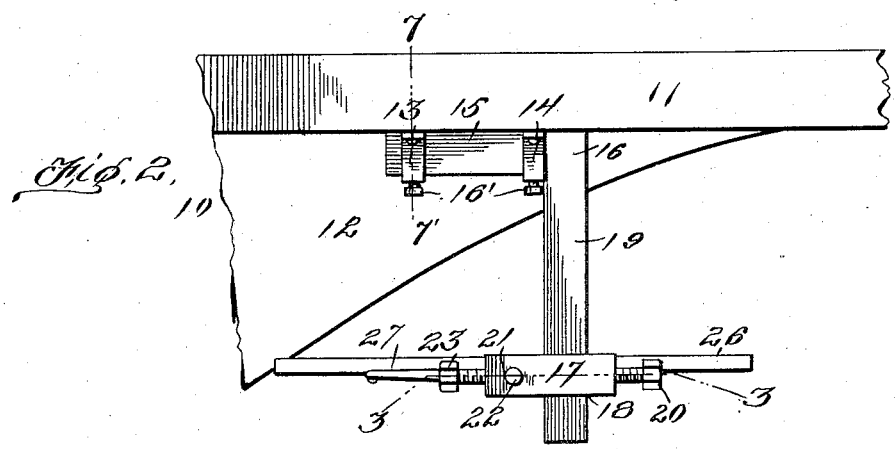
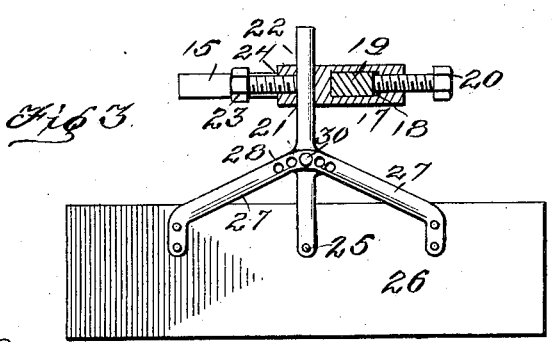
Inventor
John W. Raper.
Witnesses
By Woodward & Chandlee
Attorney

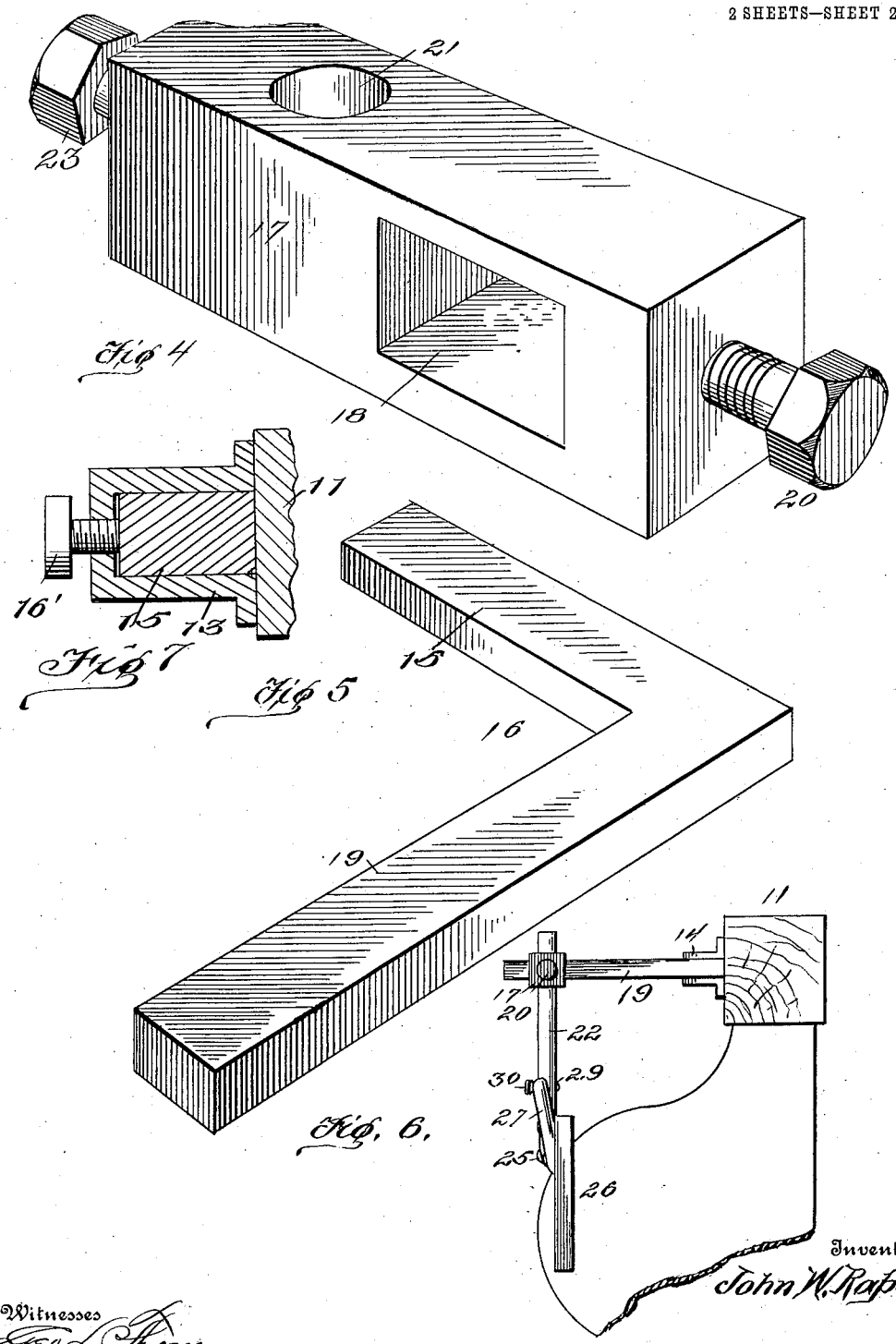

UNITED STATES PATENT OFFICE.

JOHN W. RAPER, OF BRYANT, SOUTH DAKOTA.

FENDER FOR AGRICULTURAL IMPLEMENTS.

No. 893,371.  Specification of Letters Patent.  Patented July 14, 1908.

Application filed September 16, 1907. Serial No. 393,131.

*To all whom it may concern:*

Be it known that I, JOHN W. RAPER, a citizen of the United States, residing at Bryant, in the county of Hamlin and State of South Dakota, have invented certain new and useful Improvements in Fenders for Agricultural Implements, of which the following is a specification.

This invention relates to agricultural implements, and more particularly to plows, and has for its object the provision of a fender adapted for attachment to plows, and by means of which young plants may be protected during plowing.

A further object of this invention is to provide a device of this character which may be adjusted to suit all types of mold boards.

Other objects and advantages will be apparent from the following description and it will be understood that changes in the specific structure shown and described may be made within the scope of the claims without departing from the spirit of the invention.

In the drawings forming a portion of this specification, and in which like numerals of reference indicate similar parts in the several views, Figure 1 is a side elevation of a plow showing the application of my invention thereto. Fig. 2 is a top plan view. Fig. 3 is a section on the line 3—3 in Fig. 2. Fig. 4 is a detail perspective view of the adjustable block. Fig. 5 is a detail perspective view of the block supporting bracket. Fig. 6 is a front elevation of the fender. Fig. 7 is a transverse sectional view on the line 7—7 of Fig. 2.

Referring now more particularly to the drawings, there is shown a plow 10 of usual construction including the beam 11 and mold board 12.

Guides 13 and 14 respectively are secured to one side of the beam 10, and these guides are so positioned as to receive the horizontal arm 15 of the bracket 16. The arm 15 is thus adjustable longitudinally of the beam 10, as shown, and set screws 16' are carried by the guides 13 and 14, and these set screws are arranged to bear against the outer edge of the arm 15, at different points of its adjustment.

An elongated block 17 is adjustable laterally of the plow beam 10, and to accomplish this, the block is provided with a passage 18, through which is disposed an arm 19 of the bracket 16. A set screw 20 is disposed within a threaded opening in one end of the block 17, and is thus arranged to bear upon the arm 19 after the proper adjustment has been had.

Rearwardly of the passage 18, there is shown a vertical passage 21, and this passage is arranged to receive a rod 22, and this rod is thus clamped by means of a set screw 23, which is disposed within a threaded opening 24 in the end of the block 17 opposite the set screw 20. Pivoted as at 25 and to the rod 22, there is shown a fender 26, and secured on one side thereof, there is shown an arcuate bar 27, and this bar is provided with a series of transverse passages 28 and these passages arranged to register with a transverse passage 29 in the rod 22. A set screw 30 is disposed within the passage 29 and this set-screw is thus arranged for engagement with one of the series of passages in the bar 27.

From the construction shown it will be seen that fender 26 may be adjusted angularly as well as vertically and toward or away from the mold board 13. It will thus be seen that a simple and cheap device is had which may be adjusted to all type of mold boards and which will suit all conditions of plowing.

What is claimed is:

1. In a fender of the class described, the combination with spaced guides, of a bracket including arms extending at right angles to each other, said bracket having one arm slidably engaged in the guides, means for holding said arm at different points of its movement in the guides, and blocks slidably mounted on the other arm of the bracket, means for holding the block at different points of its movement upon said arm, said block having a vertical passage formed therethrough, a rod slidably engaged in the vertical passage, means for holding the rod at different points of its movement, a fender pivoted to the lower end of the rod, an arcuate bar secured at its ends to the fender at opposite sides of the rod, said rod having a transverse passage therethrough, said arcuate bar having a series of passages formed therethrough arranged for interchangeable registration with the passage of the rod, and a fastening device arranged for engagement in the registering passages.

2. In a fender of the class described, the combination with attaching means, of a bracket slidably connected with the attaching means, said bracket including an outwardly extending arm, a block slidably engaged upon the arm, a set screw engaged in the block and arranged to impinge against the arm to hold the block at different points of its movement, said block having a vertical passage formed therethrough, a rod slidably engaged in the vertical passage in the block, a set screw arranged to impinge against the rod to hold it at different points of its movement in the vertical passage, a fender pivoted to the lower end of the rod for movement in a vertical plane, and means for holding the fender at different points of its movement.

In testimony whereof I affix my signature, in presence of two witnesses.

JOHN W. RAPER.

Witnesses:
E. A. RUDEN,
F. M. LANE.